(12) United States Patent
Jiang et al.

(10) Patent No.: US 7,620,671 B2
(45) Date of Patent: Nov. 17, 2009

(54) DELEGATION OF METADATA MANAGEMENT IN A STORAGE SYSTEM BY LEASING OF FREE FILE SYSTEM BLOCKS FROM A FILE SYSTEM OWNER

(75) Inventors: Xiaoye Jiang, Shrewsbury, MA (US); Gang Ma, Shrewsbury, MA (US); Uresh K. Vahalia, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 508 days.

(21) Appl. No.: 11/168,136

(22) Filed: Jun. 27, 2005

(65) Prior Publication Data

US 2005/0240628 A1 Oct. 27, 2005

Related U.S. Application Data

(63) Continuation of application No. 10/116,369, filed on Apr. 4, 2002, now Pat. No. 7,010,554, and a continuation-in-part of application No. 09/261,621, filed on Mar. 3, 1999, now Pat. No. 6,973,455.

(51) Int. Cl.
*G06F 17/30* (2006.01)

(52) U.S. Cl. ........................ 707/205; 707/200; 709/217

(58) Field of Classification Search ..................... 707/1, 707/200, 205; 711/152; 709/217, 201
See application file for complete search history.

(56) References Cited

U.S. PATENT DOCUMENTS

| | | |
|---|---|---|
| 4,780,821 A | 10/1988 | Crossley |
| 5,175,852 A | 12/1992 | Johnson et al. |
| 5,226,159 A | 7/1993 | Henson et al. |
| 5,394,526 A | 2/1995 | Crouse et al. |
| 5,537,645 A | 7/1996 | Henson et al. |
| 5,541,925 A | 7/1996 | Pittenger et al. |
| 5,675,802 A | 10/1997 | Allen et al. |
| 5,734,898 A | 3/1998 | He |
| 5,737,747 A | 4/1998 | Vishlitzky et al. |
| 5,774,660 A | 6/1998 | Brendel et al. |

(Continued)

OTHER PUBLICATIONS

Notice of Recordation of Assignment Document, recorded Jun. 27, 2005, Reel 016742 Frame 0242, Xiaoye Jiang et al., U.S. Appl. No. 11/168,136, filed Jun. 27, 2005, published , United States Patent and Trademark Office, Arlington, VA.

(Continued)

*Primary Examiner*—John R. Cottingham
*Assistant Examiner*—Sherief Badawi
(74) *Attorney, Agent, or Firm*—Richard Auchterlonie; Novak Druce & Quigg, LLP (57) ABSTRACT

Metadata management in a file server or storage network is delegated from a primary data processor to a secondary data processor in order to reduce data traffic between the primary data processor and the secondary data processor. The primary data processor retains responsibility for managing locks upon objects in the file system that it owns, and also retains responsibility for allocation of free blocks and inodes of the file system. By leasing free blocks and inodes to the secondary and granting locks to the secondary, the secondary can perform the other metadata management tasks such as appending blocks to a file, truncating a file, creating a file, and deleting a file.

6 Claims, 8 Drawing Sheets

U.S. PATENT DOCUMENTS

| | | | | |
|---|---|---|---|---|
| 5,828,876 | A * | 10/1998 | Fish et al. | 707/1 |
| 5,852,747 | A | 12/1998 | Bennett et al. | |
| 5,893,086 | A * | 4/1999 | Schmuck et al. | 707/1 |
| 5,893,140 | A | 4/1999 | Vahalia et al. | |
| 5,933,603 | A | 8/1999 | Vahalia et al. | |
| 5,944,789 | A | 8/1999 | Tzelnic et al. | |
| 5,950,203 | A | 9/1999 | Stakuis et al. | |
| 5,974,424 | A | 10/1999 | Schmuck et al. | |
| 5,987,477 | A | 11/1999 | Schmuck et al. | |
| 6,023,706 | A | 2/2000 | Schmuck et al. | |
| 6,032,216 | A | 2/2000 | Schmuck et al. | |
| 6,061,504 | A | 5/2000 | Tzelnic et al. | |
| 6,085,234 | A | 7/2000 | Pitts et al. | |
| 6,161,104 | A | 12/2000 | Stakutis et al. | |
| 6,167,446 | A | 12/2000 | Lister et al. | |
| 6,173,293 | B1 | 1/2001 | Thekkath et al. | |
| 6,185,601 | B1 | 2/2001 | Wolff | |
| 6,192,408 | B1 | 2/2001 | Vahalia et al. | |
| 6,212,640 | B1 | 4/2001 | Abdelnur et al. | |
| 6,230,190 | B1 | 5/2001 | Edmonds et al. | |
| 6,324,581 | B1 | 11/2001 | Xu et al. | |
| 6,453,354 | B1 * | 9/2002 | Jiang et al. | 709/229 |
| 6,493,804 | B1 * | 12/2002 | Soltis et al. | 711/152 |
| 6,697,846 | B1 * | 2/2004 | Soltis | 709/217 |
| 6,973,455 | B1 | 12/2005 | Vahalia et al. | |
| 7,010,554 | B2 | 3/2006 | Jiang et al. | |

OTHER PUBLICATIONS

Xiaoye Jiang et al., "File Server System Using Connection-Oriented Protocol and Sharing Data Sets Among Data Movers," U.S. Appl. No. 09/261,626, filed Mar. 3, 1999, published Sep. 17, 2002, United States Patent and Trademark Office, Arlington, VA.

Notice of Recordation of Assignment Document, recorded Mar. 3, 1999, Reel 9803 Frame 0658, Xiaoye Jiang et al., U.S. Appl. No. 09/261,626, filed Mar. 3, 1999, published Sep. 17, 2002, United States Patent and Trademark Office, Arlington, VA.

Uresh K. Vahalia et al., U.S. Appl. No. 09/261,621, filed Mar. 3, 1999, published Dec. 6, 2005, United States Patent and Trademark Office, Arlington, VA.

Notice of Recordation of Assignment Document, recorded Mar. 3, 1999, Reel 9803 Frame 0548, Uresh K. Vahalia et al., U.S. Appl. No. 09/261,621, filed Mar. 3, 1999, published Dec. 6, 2005, United States Patent and Trademark Office, Arlington, VA.

Rule 132 Declaration of Xiaoye Jiang, dated Nov. 16, 2007, published in Xiaoye Jiang et al., U.S. Appl. No. 11/168,136, filed Jun. 27, 2005, United States Patent and Trademark Office, Arlington, VA.

Rule 132 Declaration of Gang Ma, dated Nov. 26, 2007, published in Xiaoye Jiang et al., U.S. Appl. No. 11/168,136 filed Jun. 27, 2005, United States Patent and Trademark Office, Arlington, VA.

Rule 132 Declaration of Uresh K. Vahalia, dated Nov. 18, 2007, published in Xiaoye Jiang et al., U.S. Appl. No. 11/168,136 filed Jun. 27, 2005, United States Patent and Trademark Office, Arlington, VA.

Rule 132 Declaration of Percy Tzelnic, dated Nov. 19, 2007, published in Xiaoye Jiang et al., U.S. Appl. No. 11/168,136, filed Jun. 27, 2005, United States Patent and Trademark Office, Arlington, VA.

Uresh Vahalia, Unix Internals: The New Frontiers, Chapter 9, "File System Implementations," Prentice-Hall, Inc., New Jersey, 1996, p. 261-289.

Network Working Group, "NFS: Network File System Protocol Specification", Sun Microsystems, Inc., Mar. 1989, http://www.attrition.org/.about.modify/texts/rfc/rfc1094.txt, published at least as early as Nov. 1, 2000, 27 pages.

* cited by examiner

DELEGATION OF METADATA MANAGEMENT IN A STORAGE SYSTEM BY LEASING OF FREE FILE SYSTEM BLOCKS FROM A FILE SYSTEM OWNER

RELATED APPLICATIONS

The present application is a continuation of Xiaoye Jiang et al. U.S. Ser. No. 10/116,369 filed Apr. 4, 2002, now U.S. Pat. No. 7,010,554 published as US-2003-0191745-A1, incorporated herein by reference. The present application also is a continuation-in-part of Uresh K. Vahalia et al. U.S. Ser. No. 09/261,621 filed Mar. 3, 1999 now U.S. Pat. No. 6,973,455.

BACKGROUND OF THE INVENTION

1. Field of the Invention

The present invention relates generally to data storage systems, and more particularly to network file servers. The present invention specifically relates to a network file server in which file access is shared among a number of processors by granting file locks and distributing file metadata to the processors.

2. Description of the Related Art

Mainframe data processing, and more recently distributed computing, have required increasingly large amounts of data storage. This data storage is most economically provided by an array of low-cost disk drives integrated with a large semiconductor cache memory.

In a network environment, at least one data mover computer is used to interface the cached disk array to the network. The data mover computer performs file locking management and mapping of the network files to logical block addresses of storage in the cached disk array, and moves data between network clients and the storage in the cached disk array.

In relatively large networks, it is desirable to have multiple data mover computers that access one or more cached disk arrays. Each data mover computer provides at least one network port for servicing client requests. Each data mover computer is relatively inexpensive compared to a cached disk array. Therefore, multiple data movers can be added easily until the cached disk array becomes a bottleneck to data access.

Unfortunately, data consistency problems may arise if concurrent client access to a read/write file is permitted through more than one data mover. These data consistency problems can be solved in a number of ways. For example, as described in Vahalia et al., U.S. Pat. No. 5,893,140 issued Apr. 6, 1999, entitled "File Server Having a File System Cache and Protocol for Truly Safe Asynchronous Writes," incorporated herein by reference, locking information can be stored in the cached disk array, or cached in the data mover computers if a cache coherency scheme is used to maintain consistent locking data in the caches of the data mover computers.

SUMMARY OF THE INVENTION

A file server may use a file manager to manage file locks and file metadata for an assigned file system. In this case it is possible for the file manager to delegate certain metadata management tasks to another processor or to a trusted client. By delegating these metadata management tasks, there is a reduction in the amount of data traffic with the file manager when accessing the metadata of the assigned file system. This is especially advantageous for avoiding peak load conditions when the file manager might concurrently receive a large number of requests for locks and metadata.

In accordance with one aspect of the invention, there is provided a method of operating a primary data processor and a secondary data processor for access to a file system in data storage. The method includes the primary data processor managing locks upon files in the file system, and managing allocation of free blocks of the file system. The method further includes appending new data to a file in the file system by the secondary data processor obtaining an allocation of at least one free block from the primary data processor, the secondary data processor writing the new data to the free block, the secondary data processor obtaining a lock on the file from the primary data processor, and the secondary data processor updating metadata of the file.

In accordance with another aspect of the invention, there is provided a method of operating a primary data processor and a secondary data processor for access to a file system in data storage. The method includes the primary data processor managing locks upon files in the file system, and managing allocation of free blocks of the file system. The method further includes the secondary data processor appending new data to a file in the file system by obtaining an allocation of at least one free block from the primary data processor, writing the new data to the free block, obtaining a lock on the file from the primary data processor, and linking the free block to the file.

In accordance with still another aspect, the invention provides a storage system. The storage system includes data storage containing a file system, a primary data processor linked to the data storage for access to metadata of the file system for locking files of the file system and allocating free blocks in the file system, and a secondary data processor linked to the data storage for access to data and metadata of the file system over a data path that bypasses the primary data processor, and linked to the primary data processor for requesting and obtaining locks on the files in the file system and requesting and obtaining allocations of free blocks in the file system. The secondary processor is programmed for writing data to a specified file in the file system by obtaining an allocation of at least one free block from the primary data processor, writing data to the free block, obtaining a lock on the specified file from the primary data processor, and appending the free block to the specified file by writing new metadata for the specified file to the file system in the data storage over the data path that bypasses the primary data processor.

BRIEF DESCRIPTION OF THE DRAWINGS

Other objects and advantages of the invention will become apparent upon reading the following detailed description with reference to the accompanying drawings wherein.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DESCRIPTION OF ILLUSTRATIVE EMBODIMENTS

Figure 1:
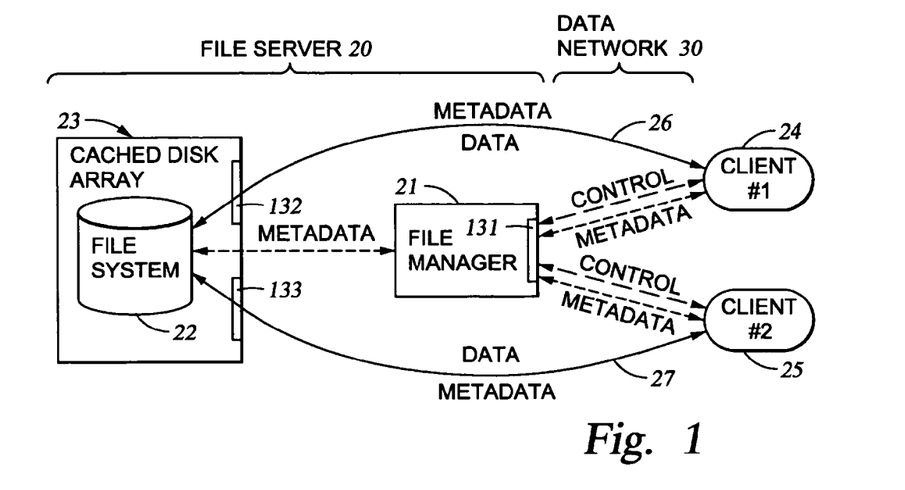
FIG. 1 is a block diagram of a data storage network in which a client requests a distributed file lock from a file manager and receives metadata from the file server in order to directly access the data and metadata of the file in data storage of the file server.

Referring to FIG. 1, there is shown a network file server architecture that uses distributed locking. In this example, a file server 20 includes a file manager 21 and data storage such as a file system 22 in a cached disk array 23. The file manager 21, for example, is a high-end commodity computer including a single-chip processor, a PCI or EISA bus, random access memory, a hard disk drive for nonvolatile program storage, and a floppy disk drive for loading programs. The cached disk array 23, for example, is a Symmetrix 5500 (Trademark) cached disk array manufactured and sold by EMC Corporation, 35 Parkwood Drive, Hopkinton, Mass. 01748.

The file manager 21 manages locking information for the files in the file system 22. The locking information is stored in the cached disk array 23, and the file manager 21 maintains a cache memory of recently accessed locking information and other related metadata.

As shown in FIG. 1, the file manager 21 has at least one network port 131 connected through a data network 30 to a first client 24 and a second client 25. The network port 31 is shared among requests from the clients 24, 25, although a separate respective network port could be provided for each of the clients 24, 25. Each client 24, 25 also has a respective bypass data path 26, 27 that bypasses the file manager 21 for reading data and metadata from and writing data and metadata to the file system 22. The cached disk array 23 has one network port 132 for the bypass data path 26, and another network port 133 for the bypass data path 27. Alternatively, the two bypass data paths 26, 27 could share one network port of the cached disk array 23, although such sharing could limit the maximum data transfer rate to the data storage in the cached disk array for simultaneous data access by the clients 24, 25.

Before reading or writing to the file system 22, a client first issues a request for a lock to the file manager 21. The file manager 21 responds by placing a lock on the file to be accessed, and returning metadata including at least one pointer to where the data or additional metadata to be accessed is stored in the file system. The client uses the pointer to formulate a read or write request sent over the bypass data path to the file system 22.

Figure 2:
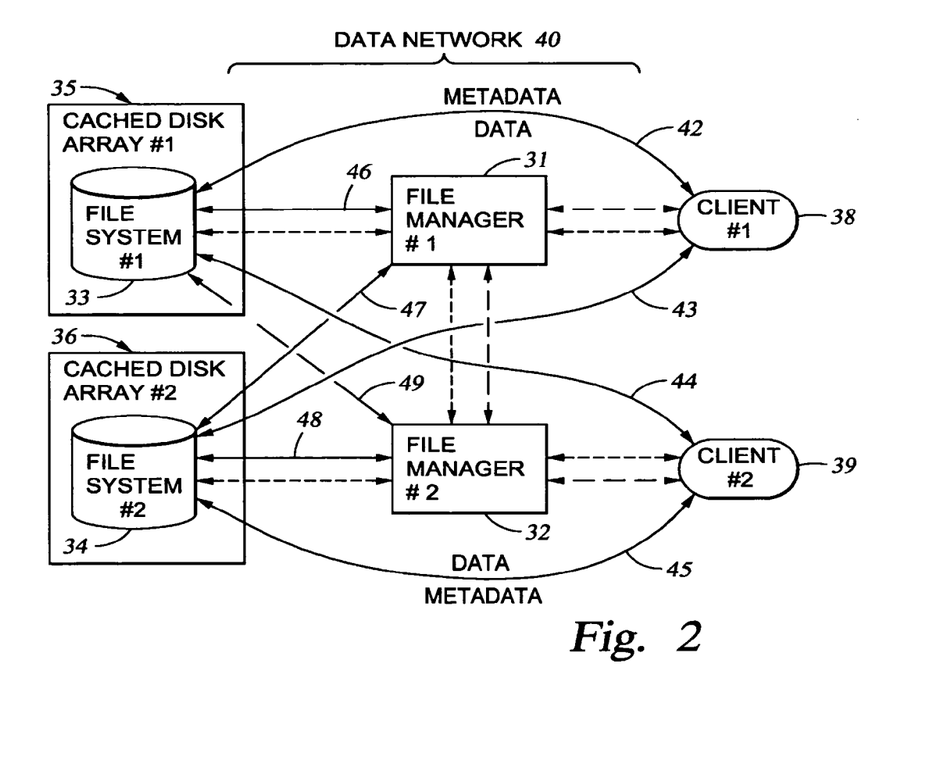
FIG. 2 is a block diagram of a more complex data storage network including more than one file manager and more than one file system, in which access to each file system is managed by one and only one of the file managers.

With reference to FIG. 2, there is shown a more complex network file server architecture that permits storage resources to be incrementally added to provide sufficient storage capacity for any desired number of file systems. In this example, a data network 40 includes a first file manager 31, a second file manager 32, a first cached disk array 35, a second cached disk array 36, a first client 38, and a second client 39. In this example, the data movers 31, 32 and the cached disk arrays 35, 36 could be spaced from each other, placed at various geographic locations, and interconnected by high-speed Fibre Channel data links. Alternatively, the cached disk arrays 35, 36 and file managers 31, 32 could be placed in the same geographic location. For example, if the cached disk arrays and file managers were placed in the same geographic location, they could be constructed and interconnected as shown in Vahalia et al. U.S. Pat. No. 5,893,140, issued Apr. 6, 1999, incorporated herein by reference.

In FIG. 2, the first file manager 31 manages the file locking information of a first file system 33 in the first cached disk array 35, and the second file manager 32 manages the locking information of a second file system 34 in the second cached disk array 36. In particular, the locking information for each file system 33, 34 is managed exclusively by only one of the file managers 31, 32. This exclusive relationship will be referred to by saying each file system has a respective file manager that is the owner of the file system. Therefore, the first file manager 31 is the owner of the first file system 33, and the second file manager 32 is the owner of the second file system 34.

The first file manager 31 is connected to the first cached disk array 35 for the communication of metadata of the first file system 33, and the second file manager 32 is connected to the second cached disk array 36 for the communication of metadata of the second file system 34. The first file manager 31 is connected to the second file manager 32 for the communication of metadata and control information with respect to the first file system 33 and the second file system 34. The first file manager 31 is linked to a first client 38 for the communication of metadata and control information with respect to the first file system 33 and the second file system 34. The second file manager 32 is linked to a second client 39 for the communication of metadata and control information with respect to the first file system 33 and the second file system 34.

The first client 38 has a bypass data path 42 to the first file system 33 for bypassing the first file manager 31, and a bypass data path 43 to the second file system 34 for bypassing the first file manager 31 and also bypassing the second file manager 32. The second client 39 has a bypass data path 44 to the first file system 33 for bypassing the first file manager 31 and the second file manager 32, and a bypass data path 45 to the second file system 34 for bypassing the second file manager 32.

The first client 38 accesses the first file system 33 in the fashion described above with respect to FIG. 1, by obtaining a lock from first file manager 31 and then accessing the first file system 33 over the bypass data path 42. To access the second file system 34, however, the first client issues a request for a lock to the first file manager 31. The first file manager 31 recognizes that it is not the owner of the file system to be accessed, and therefore forwards the request to the second file manager 32. The second file manager 32 responds by placing an appropriate lock on the file to be accessed, and returning metadata including at least one pointer to where the data or additional metadata to be accessed is stored in the second file system 34. The first file manager 31 relays the pointer to the first client 38. The first client uses the pointer to formulate a read or write request sent over the bypass data path 43 to the second file system 34.

In a similar fashion, the second client 39 accesses the second file system 34 in the fashion described above with respect to FIG. 1, by obtaining a lock from the second file manager 32 and then accessing the second file system 34 over the bypass data path 45. To access the first file system 33, the second client 39 issues a request for a lock to the second file manager 32. The second file manager 32 recognizes that it is not the owner of the file system to be accessed, and therefore forwards the request to the first file manager 31. The first file manager 31 responds by placing a lock on the file to be accessed, and returning metadata including at least one pointer to where the data or additional metadata to be accessed is stored in the first file system 33. The second file manager 32 relays the pointer to the second client 38. The second client uses the pointer to formulate a read or write request sent over the bypass data path 44 to the first file system 33.

In the storage network of FIG. 2, the file managers may also access file data in the file systems 33, 34 in the cached disk arrays 35, 36. For example, the first file manager 31 has a data path 46 to the first cached disk array 35, and a data path 47 to the second cached disk array 36 that bypasses the second file manager 32. The second file manager 32 has a data path 48 to the second cached disk array 36, and a data path 49 to the first cached disk array that bypasses the first file manager 31. If a file manager desires to access directly data of a file in a file system that is owned by another file manager, it must ask the owner for a lock on the file before accessing the file data.

Figure 3:
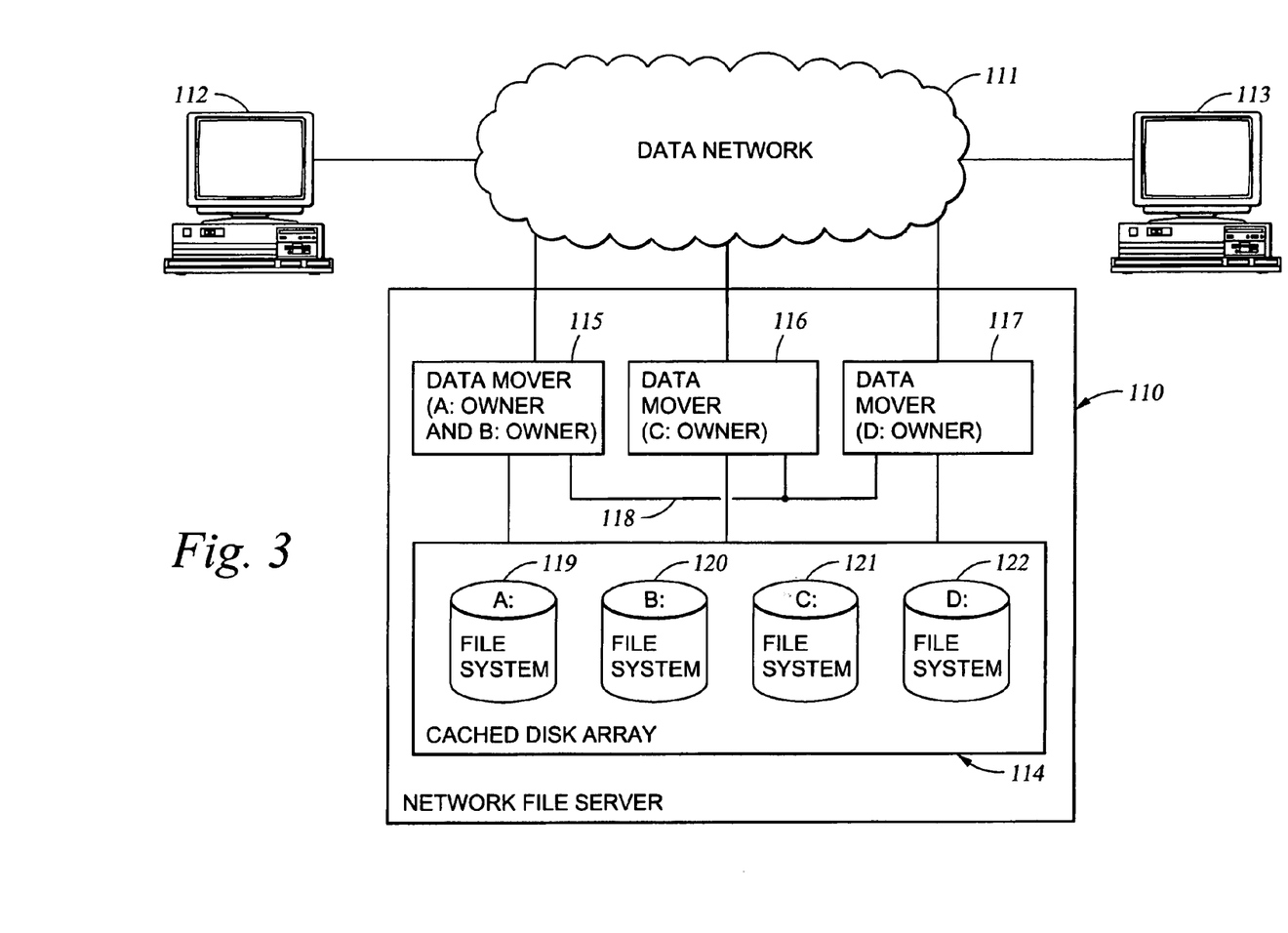
FIG. 3 is a block diagram of a data processing system including a network file server having a plurality of data mover computers, each of which manages a respective file system.

The file system management method introduced in FIG. 2 can also be used in a network file server having multiple processors for servicing client requests. With reference to FIG. 3, a network file server 110 has a plurality of data mover computers 115, 116, 117, each of which manages a respective file system. Each data mover computer 115, 116, 117 has a respective port to a data network 111 having a number of clients including work stations 112, 113. The data network 111 may include any one or more network connection technologies, such as Ethernet, and communication protocols, such as TCP/IP or UDP. The work stations 112, 113, for example, are personal computers. The preferred construction and operation of the network file server 110 is further described in Vahalia et al., U.S. Pat. No. 5,893,140 issued Apr. 6, 1999, incorporated herein by reference. The network file server 110 includes a cached disk array 114. The network file server 110 is managed as a dedicated network appliance, integrated with popular network operating systems in a way, which, other than its superior performance, is transparent to the end user. The clustering of the data movers 115, 116, 117 as a front end to the cached disk array 114 provides parallelism and scalability. Each of the data movers 115, 116, 117 is a high-end commodity computer, providing the highest performance appropriate for a data mover at the lowest cost. The data movers may communicate with each other over a dedicated dual-redundant Ethernet connection 118. The data mover computers 115, 116, and 117 may communicate with the other network devices using standard file access protocols such as the Network File System (NFS) or the Common Internet File System (CIFS) protocols, but the data mover computers do not necessarily employ standard operating systems. For example, the network file server 110 is programmed with a Unix-based file system that has been adapted for rapid file access and streaming of data between the cached disk array 114 and the data network 111 by any one of the data mover computers 115, 116, 117. Therefore, each client 112, 113 may access any of the file systems through any one of the data mover computers 115, 116, 117, but if the data mover computer servicing the client does not own the file system to be accessed, then a lock on the file system to be accessed must be obtained from the data mover computer that owns the file system to be accessed.

In the data storage networks of FIG. 1, 2 or 3, it is possible for a write operation to change the attributes of a file, for example, when the extent of a file is increased by appending data to a file. When a write operation will change the metadata of a file, the metadata must be managed in a consistent fashion, in order to avoid conflict between the file manager owning the file, and the client or file manager performing the write operation. For example, as described in Xu et al., U.S. Pat. No. 6,324,581, issued Nov. 27, 2001, incorporated herein by reference, when a write operation changes the metadata of a file, the new metadata is written to the file manager owning the file. This ensures that the file manager owning the file maintains consistent metadata in its cache.

In a file server of the kind that uses a file manager to manage locks for an assigned file system, it is possible for the file manager to delegate certain metadata management tasks to another file manager or to a trusted client. By delegating these metadata management tasks, there is a reduction in the amount of data traffic with the file manager when accessing the file system owned by the file manager. This is especially advantageous for avoiding peak load conditions when the file manager might concurrently receive a large number of requests for locks.

With reference to FIG. 1, for example, the file manager 21 delegates metadata management tasks to the clients 24, 25 so that the clients may read or write certain metadata directly to and from the file system 22 in the cached disk array 23 instead of reading or writing that metadata to and from the file manager 21. This may increase the performance of the system in FIG. 1 when the client access to the file manager is more limited than the client access to the cached disk array.

With reference to FIG. 2, the delegation of metadata management tasks to the clients 38, 39 is useful for avoiding peak loading upon the file manager owner 31 or 32 when the clients 38, 39 would happen to perform concurrent write operations to the same one of the file systems 33 or 34. The delegation of metadata management tasks to the clients 38, 39 also reduces data traffic between the file managers 31, 32.

With reference to FIG. 3, the data mover owning a particular file system will be referred to as the primary data mover for that file system, and the data movers that do not own that file system will be referred to as the secondary data movers for that file system. For example, in FIG. 3, the file system "B:" 120 is owned by the data mover 116, so that the data mover 116 is the primary data mover for the file system "B:" and the data movers 115 and 117 are secondary data movers with respect to the file system "B:".

In the network file server 110 of FIG. 3, the delegation of metadata management tasks to the secondary data movers 115, 116, 117 is useful for avoiding peak loading upon the primary data movers 115, 116, or 117 when the client work-stations 112, 113 would happen to perform concurrent write operations to the same one of the file systems 119, 120, 121, or 122. The delegation of metadata management tasks to the secondary data movers 115, 116, 117 also reduces data traffic over the link 118 between the data movers.

In a preferred implementation, the file system owner delegates the task of metadata management in order to permit a client, secondary file manager or secondary data mover to modify metadata of a file or directory in the on-disk file system. For example, the metadata of a file may be changed during an append or truncation of a file, and the metadata of a directory may be changed during the creation or deletion of a file in the directory. In order to delegate these tasks, the file system owner not only grants locks upon the file or directory to a client, secondary file manager or secondary data mover, but also "leases" inodes and blocks of the file system to the client, secondary file manager or secondary data mover.

Figure 4:
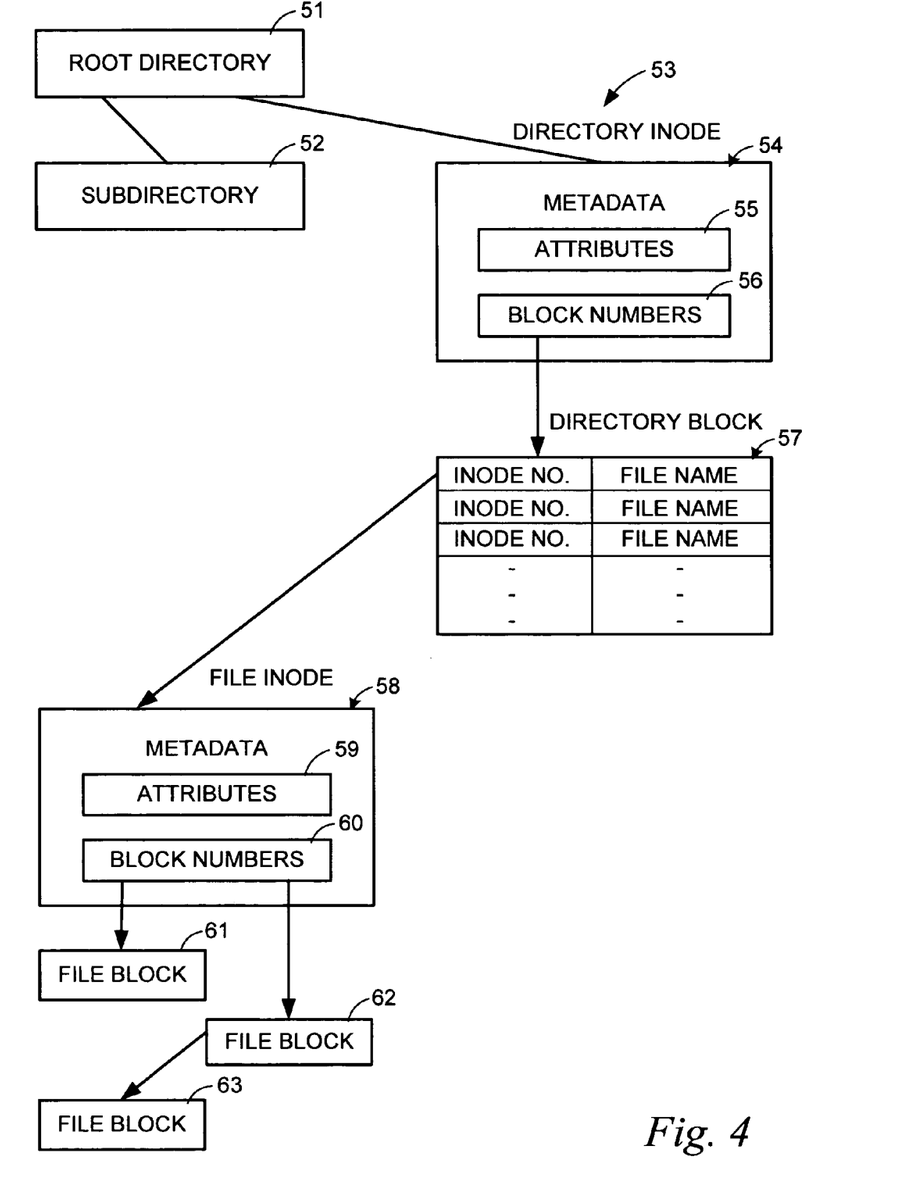
FIG. 4 is a block diagram of a file system, showing various inodes and blocks.

FIG. 4 shows various inodes and blocks in a UNIX (Trademark) based file system, such as the System V file system (s5fs) and the Berkeley Fast File System (FFS), as described in chapter 9 of Uresh Vahalia, *UNIX Internals: The New Frontier*, Prentice-Hall, Inc., 1996, p. 261-289. In general, a file system includes a hierarchy of directories, and each directory can be an index for a number of subdirectories or files. For the particular file system shown in FIG. 4, the hierarchy of directories has a top-level root directory 51, which is an index to a subdirectory 52 and a subdirectory 53. The subdirectory 53 has been expanded to show that it is comprised of a directory inode 54 and a directory block 57. The directory inode 54 includes attributes 55 of the subdirectory 53 (such as the file type, access permissions, owner information, and access history) and other metadata such as block numbers 56, one of which points to the directory block 57. The directory block 57 contains a table of inode numbers associated with respective file names of the subdirectories and files indexed by the subdirectory 53. For example, the first inode number points to a file inode 58 containing attributes 59 of a file and block numbers 60 pointing to file blocks 61 and 62 containing data of the file. The file block 62 is a so-called indirect block, which contains a pointer to another file block 63 of the file.

Figure 5:
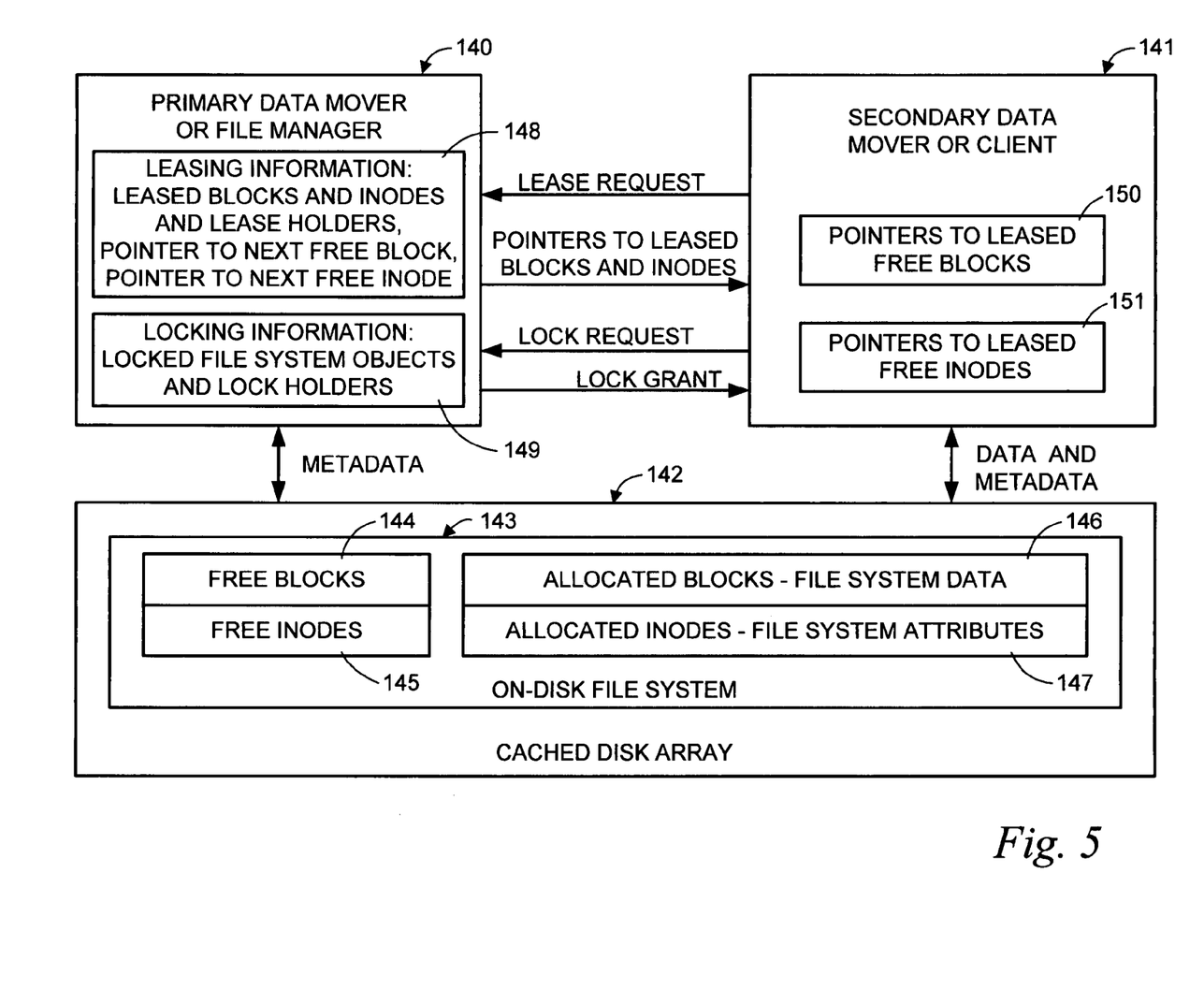
FIG. 5 is a block diagram showing the management of metadata by a file manager or data mover that owns a file system in storage, and a client or data mover that is secondary with respect to the file system.

FIG. 5 shows the management of metadata by a primary data mover or file manager 140 that owns a file system 143 in storage of a cached disk array 142, and a data mover or client 141 that is secondary with respect to the file system. The on-disk file system 143 includes free blocks 144, free inodes 145, allocated blocks 146, and allocated inodes 147. The allocated blocks 146 may contain valid file or directory data, and the allocated inodes 147 may contain valid file or directory attributes.

The primary data mover or file manager 140 manages leasing of the free blocks 144 and free inodes 145 to the secondary data mover or client 141. In response to a lease request for free blocks or free inodes, the primary data mover or file manager 140 allocates a number of the free blocks 144 or free inodes 145 to the secondary data mover or client 141, and returns to the secondary a list of pointers (block numbers or inode numbers) to the leased blocks and inodes. For lease management, the primary 140 maintains leasing information 148 including a pointer to a next free block 144 not yet leased or allocated, and a pointer to a next free inode 146 not yet leased or allocated. For recovering from a "crash" or failure of the secondary data mover or client 141, the leasing information 148 may also include a log of the leased blocks and inodes and the lease holders.

The primary data mover or file manager 140 also manages the granting of locks on files and directories to the secondary data mover or client 141. The primary data mover or file manager 140 maintains locking information 149 identifying the locked file system objects and lock holders. The locking information may also include, for each locked object, a list of outstanding requests for a conflicting lock.

In operation, the secondary data mover or client 141 maintains a list 150 of pointers to leased free blocks, and a list of pointers 151 to leased free inodes. When the list 150 or 151 is nearly empty, or when the secondary 141 needs more pointers to free blocks or inodes for the delegated metadata management, the secondary 141 sends a lease request to the primary data mover or client 140 to obtain more pointers.

When the secondary data mover or client 141 needs to read or write to a directory or file in the file system 143 owned by the primary data mover or file manager 140, the secondary 141 first sends a lock request to the primary 140. The lock request, for example, specifies the path name of the file or directory, and the type of access (read-only or read-write). The primary data mover or file manager 140 does a file system lookup on the path name of the directory or file in order to find the directory block entry (see 57 in FIG. 4) including the directory or file name and the file inode number associated with the directory or file name. The primary data mover or file manager 140 checks whether there is a read or write lock presently held on the associated directory or file inode, and checks whether any lock presently held conflicts with the requested lock. The primary data mover or file manager 140 may also check for conflict with any access permission attribute in the associated directory or file inode. If there is no conflict, then the primary data mover or file manager 140 returns a lock grant to the secondary data mover or client 141, including the inode number of the associated directory or file inode. The secondary data mover or client 141 then uses the inode number to directly access the metadata in the directory or file inode in the on-disk file system 143.

For certain write operations, the secondary data mover or client 141 may change the metadata in the directory or file inode in the on-disk file system 143, without writing the new metadata to the primary data mover or file manager 140. If the primary data mover or file manager 140 keeps a local cache of the directory or file inode, then the directory or file inode in that local cache should be invalidated when the primary 140 grants a write lock on the directory or file inode to the secondary data mover or client 141. Therefore, if and when the primary data mover or client manager 140 would later need to access the directory or file inode, the primary 140 would first check that there is no conflicting lock on the directory or file inode, and then grant itself a lock on the directory or file inode, and then refresh its local cache by fetching the directory or file inode from the on-disk file system 143. In this fashion, new metadata from the secondary data mover or client 141 is written to the cached disk array 142 and transferred to the primary data mover or file manager 140. Because of the "fast write" capability of the cached disk array (i.e., data written to the cache of the cached disk array is considered to be in the on-disk file system 143 before the data is actually written to disk of the cached disk array), there can be a very rapid transfer of metadata through the cached disk array 142 from the secondary data mover or client 141 to the primary data mover or file manager 140.

For certain write operations, the delegated metadata management alters the structure of the file system by adding blocks or inodes. For extending a directory or file, the secondary data mover or client 141 removes one of the pointers from the list 150 to obtain the block number of a free block to become the block appended to the directory or file. The secondary data mover or client 141, for example, transfers the free block from the pool of free blocks 144 in the on-disk file system 143 and links it into the file system data structure of allocated inodes 147. For creating a new directory or a new file, the secondary data mover or client 141 removes one of the pointers from the list 151 to obtain the inode number of a free inode to become the inode of the new directory or new file. The secondary data mover or client 141, for example, transfers the free inode from the pool of free inodes 145 in the on-disk file system 143 and links it into the file system data structure of allocated inodes 147 in the on-disk file system.

Figure 6:
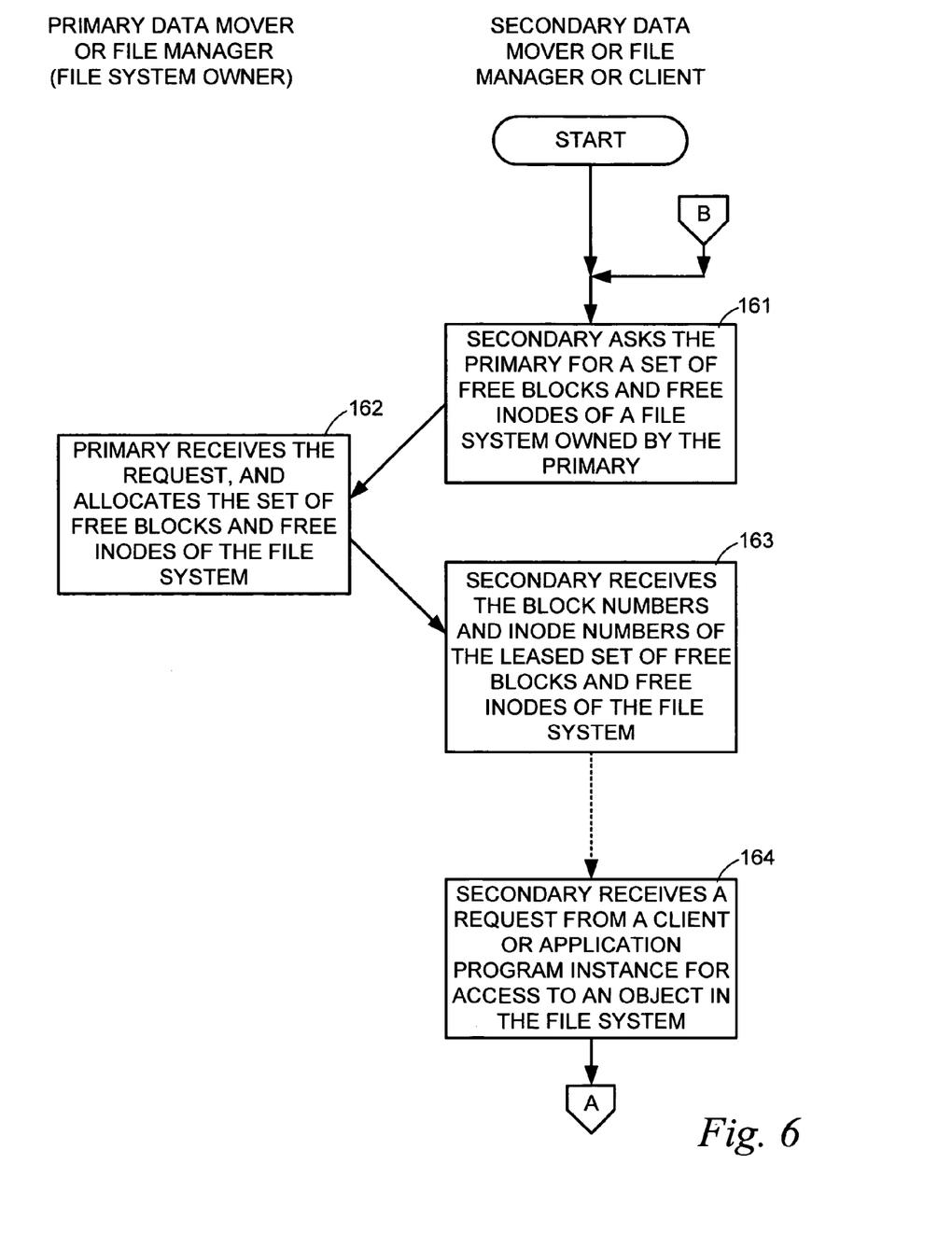
FIGS. 6 and 7 comprise a flow chart showing a method of delegating metadata management from the file manager or primary data mover in FIG. 5 to the client or secondary data mover in FIG. 5.
Figure 7:
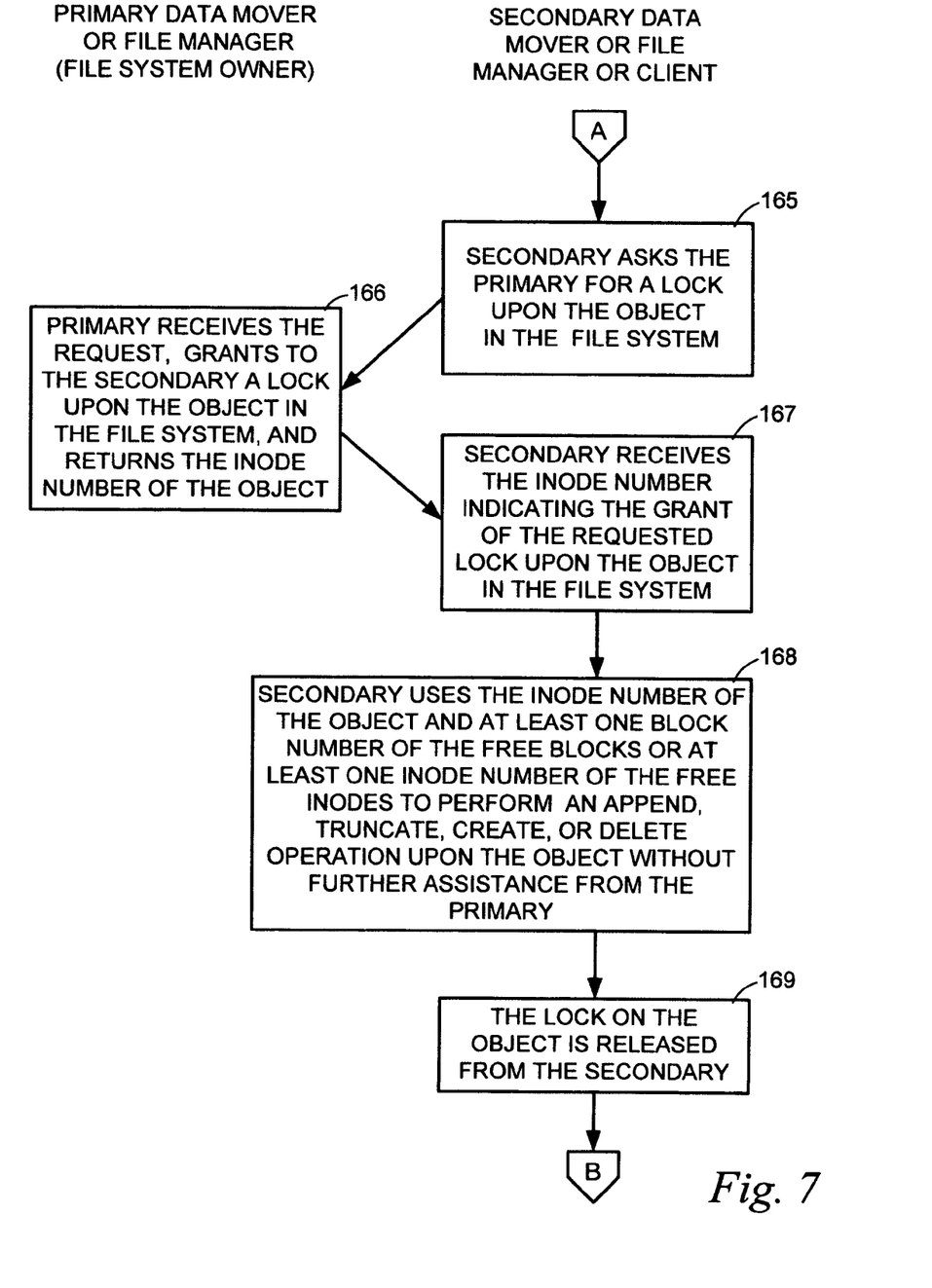

FIGS. 6 and 7 further show the delegation of metadata management from the primary data mover or file manager to the secondary data mover or file manager or client. In a first step 161, the secondary asks the primary for a set of free blocks and free inodes of a file system owned by the primary. In step 162, the primary receives the request, and allocates the set of free blocks and free inodes of the file system. For example, if the secondary asks for sixty-four free blocks, then the primary will advance its "pointer to next free block" by sixty-four blocks through the pool of free blocks (144 in FIG. 5) of the on-disk file system, to obtain a set of sixty-four block numbers for the secondary. The pool of free blocks, for example, is maintained as a linked list of block numbers, so that the primary may keep a local cache of the linked list of block numbers, and refresh the linked list in its local cache from the linked list in the on-disk file system when its "pointer to next free block" nearly reaches the end of its local copy of the linked-list.

In step 163, the secondary receives the block numbers and inode numbers of the leased set of free blocks and free inodes of the file system. Some time later, in step 164, the secondary receives a request from a client or application program instance for access to an object (such as a directory or file) in the file system. Execution continues from step 164 to step 165 in FIG. 7.

In step 165 in FIG. 7, the secondary asks the primary for a lock upon the object in the file system. In step 166, the primary receives the request, grants to the secondary a lock upon the object in the file system, and returns the inode number of the object to the secondary. In step 167, the secondary receives the inode of the object, indicating that the requested lock has been granted. In step 168, the secondary uses the inode number of the object and at least one of the block numbers of the free blocks or at least one inode number of the free inodes to perform an append, truncate, create, or delete operation upon the object without further assistance from the primary. In step 169, the lock on the object is released from the secondary.

After step 169, execution loops back to step 161 of FIG. 6 to replenish the secondary's set of leased free blocks and free inodes of the file system owned by the primary, at least if the number of the leased free blocks or the number of the leased free inodes has been depleted. In this fashion, the secondary's access of objects of the file system in steps 164 to 169 is not delayed in order to obtain free blocks and free inodes of the file system owned by the primary.

Figure 8:
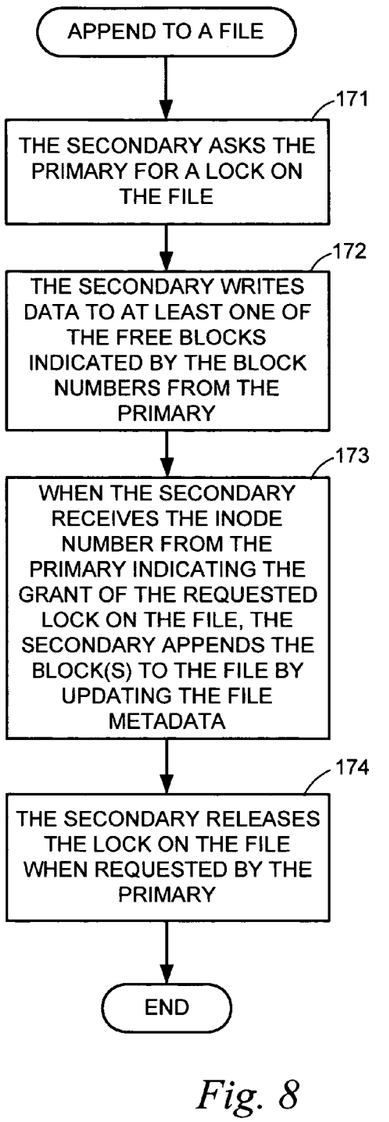
FIG. 8 is a flow chart showing specific steps for performing an append operation in accordance with the method of FIG. 7.

FIG. 8 shows specific steps for performing an append operation in accordance with the method of FIG. 7. In step 171, the secondary asks the primary for a lock on the file. In step 172, the secondary writes data to at least one of the free blocks indicated by the block numbers obtained from the primary. In step 173, when the secondary receives the inode number indicating the grant of the requested lock on the file, the secondary appends the block(s) to the file by updating the file metadata in the on-disk file system. Finally, in step 174, the secondary releases the lock on the file, for example, when requested by the primary.

Figure 9:
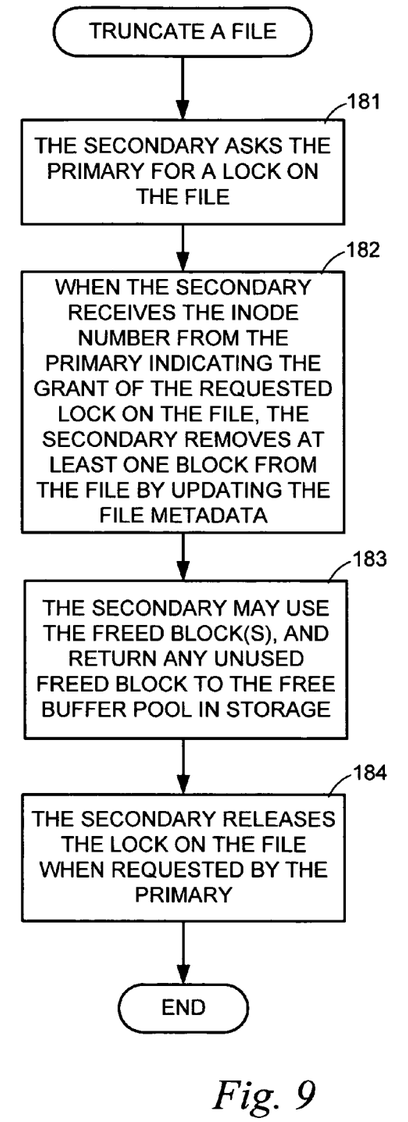
FIG. 9 is a flow chart showing specific steps for performing a truncation operation in accordance with the method of FIG. 7.

FIG. 9 shows specific steps for performing a truncation operation in accordance with the method of FIG. 7. In step 181, the secondary asks the primary for a lock on the file. In step 182, when the secondary receives the inode number from the primary indicating the grant of the requested lock on the file, the secondary removes at least one block from the file by updating the file metadata in the on-disk file system. In step 183, the secondary may use the freed block(s), and return any unused free block to the free buffer pool in the on-disk file system. Finally, in step 184, the secondary releases the lock on the file, for example, when requested by the primary.

Figure 10:
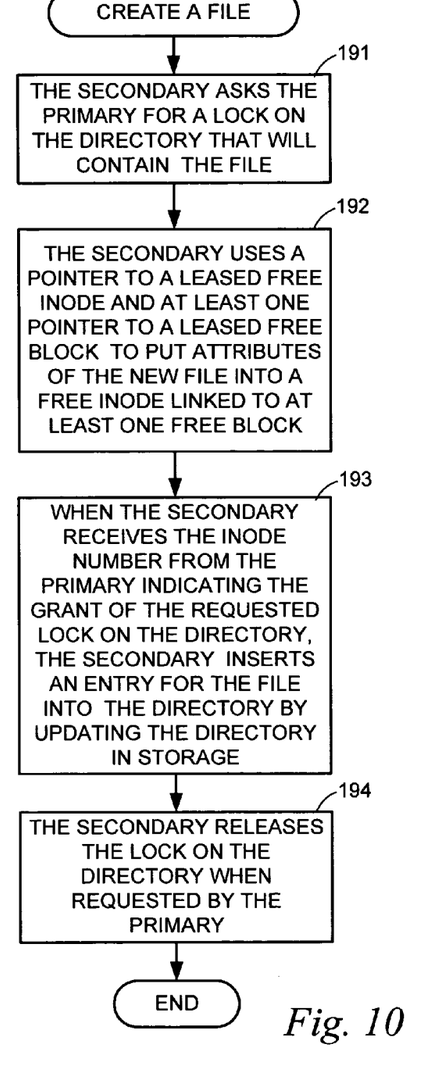
FIG. 10 is a flow chart showing specific steps for performing a file creation operation in accordance with the method of FIG. 7.

FIG. 10 shows specific steps for performing a file creation operation in accordance with the method of FIG. 7. In a first step 191, the secondary asks the primary for a lock on the directory that will contain the file. In step 192, the secondary uses one of the pointers to the leased free inodes and at least one of the pointers to the free blocks to put attributes of the new file into a free inode linked to at least one free block. In step 193, when the secondary receives the inode number from the primary indicating the grant of the requested lock on the directory, the secondary inserts an entry for the file into the directory by updating the directory in storage. Finally, in step 194, the secondary releases the lock on the directory, for example, when requested by the primary.

Figure 11:
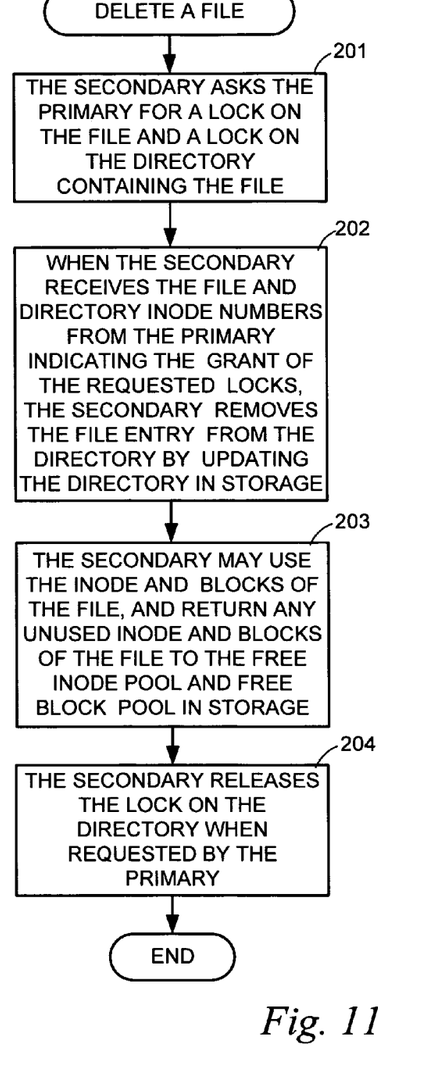
FIG. 11 is a flow chart showing specific steps for performing a file deletion operation in accordance with the method of FIG. 7.

FIG. 11 is a flow chart showing specific steps for performing a file deletion operation in accordance with the method of FIG. 7. This particular file deletion operation can be performed on a file that is a directory so long as the directory is empty. In other words, before deleting a directory, all of the subdirectories and files in the directory should be deleted.

In a first step 201 of FIG. 11, the secondary asks the primary for a lock on the file and a lock on the directory containing the file. In step 202, when the secondary receives the file inode number and the directory inode number from primary indicating the grant of the requested locks, the secondary removes the file entry from the directory by updating the directory in storage. This not only deletes the file but also has the side-effect of releasing the lock on the file. In step 203, the secondary may use the inode and blocks of the file, and return any unused inode and blocks of the file to the free inode pool and free block pool in the on-disk file system. Finally, in step 204, the secondary releases the lock on the directory, for example, when requested by the primary.

In view of the above, there has been described a method of delegation of metadata management in a file server or storage network from a primary data processor to a secondary data processor in order to reduce data traffic between the primary data processor and the secondary data processor. The primary data processor retains responsibility for managing locks upon objects in the file system that it owns, and also retains responsibility for allocation of free blocks and inodes of the file system. By leasing free blocks and inodes to the secondary and granting locks to the secondary, the secondary can perform the other metadata management tasks such as appending blocks to a file, truncating a file, creating a file, and deleting a file.

It should be understood that the preferred embodiment as described above can be modified in various ways without departing from the scope of the invention as defined by the appended claims. For example, it is not necessary to delegate all of the metadata management functions described above to the secondary. Depending on the margin of loading of the primary to secondary data path relative to the margin of loading of the secondary to storage data path, some but not all of the metadata management functions may be delegated in order to balance the margin of loading of the data paths. For example, in a particular file server configuration, it may be desirable to delegate only the "append to a file" and "truncate a file" functions. This provides a modest decrease in loading of the primary to secondary data path, and a low level of implementation complexity, because the primary need not lease inodes.

What is claimed is:

1. A storage system comprising:
   data storage containing a file system;

a primary data processor linked to the data storage for access to metadata of the file system for locking files of the file system and allocating free blocks in the file system; and a secondary data processor linked to the data storage for access to data and metadata of the file system over a data path that bypasses the primary data processor, and linked to the primary data processor for requesting and obtaining locks on the files in the file system and requesting and obtaining allocations of free blocks in the file system;

wherein the secondary data processor is programmed for writing data to a specified file in the file system by obtaining an allocation of at least one free block from the primary data processor, thereafter writing data to said at least one free block, thereafter obtaining a lock on the specified file from the primary data processor, and appending said at least one free block to the specified file by writing new metadata for the specified file to the file system in the data storage over the data path that bypasses the primary data processor, wherein the secondary data processor is programmed to send a request to the primary data processor for a lock on the specified file, and thereafter write data for the specified file to said at least one free block while the primary data processor is responding to the request for the lock on the specified file, and wherein the secondary data processor is programmed to receive from the primary data processor an inode number of an inode of the specified file with an indication of a grant of the lock on the specified file, and to use the inode number of the specified file to link said at least one free block to the specified file.

2. The storage system as claimed in claim 1, wherein the data storage is in a cached disk array, the primary data processor is a file manager computer, and the secondary data processor is a client in a data network linking the client to the cached disk array and the primary data processor.

3. The storage system as claimed in claim 1, wherein the data storage is a cached disk array in a network file server, the primary data processor is a first data mover computer in the network file server, and the secondary data processor is a second data mover computer in the network file server.

4. The storage system as claimed in claim 1, wherein the secondary data processor is programmed to truncate blocks from files of the file system by writing new metadata of the files to the file system in the data storage over the data path that bypasses the primary data processor.

5. The storage system as claimed in claim 4, wherein the secondary data processor is further programmed to return the truncated blocks to a pool of free blocks in the file system in the data storage.

6. The storage system as claimed in claim 1, wherein the secondary data processor is programmed to write to a specified directory of the file system by obtaining a lock on the specified directory from the primary data processor, and writing to the specified directory in the data storage over the data path that bypasses the primary data processor.

\* \* \* \* \*